United States Patent Office 3,849,476
Patented Nov. 19, 1974

3,849,476
PROCESS FOR MANUFACTURING 6-NITRO-2-SUBSTITUTED HEXANOIC ACID ESTERS
Ryoji Kikumoto, Kanagawa-ken, Japan, assignor to Mitsubishi Chemical Industries, Limited, Tokyo, Japan
Filed May 22, 1969, Ser. No. 826,828
Claims priority, application Japan, May 25, 1968, 43/35,335; Nov. 13, 1968, 43/82,526
Int. Cl. C07c *131/00, 79/40*
U.S. Cl. 260—478    6 Claims

ABSTRACT OF THE DISCLOSURE

An alicyclic nitro compound selected from the group consisting of 2-nitro-6-oximino-1-cyclohexene-1-ol, 2,6-dinitro cyclohexanone and monoalkali salt thereof is reacted with an alcohol in the presence of a basic catalyst to form 6-nitro-2-oximino hexanoic acid ester or 2,6-dinitro hexanoic acid ester useful for intermediate in the lysine synthesis.

---

The present invention relates to a process for manufacturing 2,6-dinitro-hexanoic acid ester and 6-nitro-2-oximino-hexanoic acid ester.

2,6-dinitro-hexanoic acid ester and 6-nitro-2-oximino-hexanoic acid ester are useful intermediate compounds in the synthesis of lysine.

A primary object of this invention is to provide a process for manufacturing 2,6-dinitro-hexanoic acid ester from 2,6-dinitro-cyclohexanon or monoalkali metal salt thereof.

Still another object is to provide a process for manufacturing 6-nitro-2-oximino-hexanoic acid ester from 2-nitro-6-oximino-1-cyclohexene-1-ol.

According to this invention, these objects are accomplished by reacting an alicyclic nitro compound selected from the group consisting of 2-nitro-6-oximino-1-cyclohexene-1-ol, 2,6-dinitro-cyclohexanone and its monoalkali metal salt with an alcohol according to the following reactions.

wherein R represents an alkyl group and M represents an alkali metal atom.

The alicyclic nitro compounds used as raw material according to this invention include 2-nitro-6-oximino-1-cyclohexene-1-ol, 2,6-dinitro-cyclohexanone and its monoalkali metal salt. The 2-nitro-6-oximino-1-cyclohexene-1-ol is to the best of the inventor's knowledge, a novel compound, and it is produced by reacting 2-nitrocyclohexanone with alkyl nitrate in the presence of an alcoholate but in the absence of water and acidifying the reaction mass so produced.

2,6-dinitrocyclohexanone and its monoalkali metal salt are produced by a known process, for example, from cyclohexanone by nitrating in the presence of an alcoholate and hydrolyzing as follows:

wherein R and R' represent an alkyl group and M represents an alkali metal atom.

Upon standing in an alcohol such alicyclic nitro compounds dissolve and 6-nitro-2-oximino-hexanoic acid ester or 2,6-dinitro-hexanoic acid ester is formed; the structure of the ester varies depending upon the nitro compound employed. This reaction is carried out over a wide temperature range, depending upon the kind of alcohol employed; however, in general, a temperature of from room temperature to 130° C., preferably from 30° C. to 100° C. is employed. The reaction is carried out most effectively at a temperature close to the boiling point of the The alcohols employed in this invention include primary, secondary and tertiary aliphatic alcohols such as methyl alcohol, ethyl alcohol, n- and iso-propyl alcohol, n-, iso- and tert-butyl alcohol, amyl alcohol, n-octyl alcohol and 2-ethyl-hexanol, as well as cyclohexanol and ethylene glycol.

The choice of alcohol is determined by the raw material employed; in general, a primary and secondary alcohol is suitable for the 6-nitro-2-oximino-1-cyclohexene-1-ol and a primary alcohol is employed for the 2,6-dinitro-cyclohexanone and its monoalkali salt. A primary alcohol is preferred due to its high reaction rate; methyl alcohol and ethyl alcohol are especially recommended.

The reaction according to this invention can be carried out in the absence of a catalyst; however, the addition of a small amount of a base material to the reaction system is preferred to accelerate the reaction. Examples of suitable base include: an alkali metal, such as metallic sodium; an alkali and alkaline earth metal hydroxides, such as sodium hydroxide, potassium hydroxide and barium hydroxide; a salt derived from an alkali and alkaline earth metal compound and an inorganic and organic acid having a diassociation constant smaller than $1.3 \times 10^{-3}$, such as sodium bicarbonate, potassium carbonate, potassium acetate, sodium and potassium propionate, sodium butyrate and sodium caproate; ammonium hydroxide; a phenolate and alcoholate of an alkali metal, such as sodium phenolate, potassium phenolate, sodium methylate and sodium ethylate; dibenzyl trimethyl ammonium hydroxide; and various organic amines having the general formula of $$N \begin{matrix} R_1 \\ -R_2 \\ R_3 \end{matrix}$$

wherein each of $R_1$, $R_2$, and $R_3$ is hydrogen alkyl or aryl but at most two of them may be hydrogen atoms, for example, an aliphatic primary, seconary or tertiary amine, such as trimethyl amine, triethyl amine, tributyl amine, n-butyl amine and di-n-butyl amine; an alicyclic amine, such as cyclohexyl amine; an aromatic amine, such as aniline; or a cyclic amine such as pyridine.

A strongly or weakly basic anion exchange resin and a dialkali metal salt of 2,6-dinitrocyclohexanone can also be employed as the catalyst. It is preferred that such base compound be present in dissolved form in the reaction mixture. If an excess of the base compound is employed, because the base compound reacts with the raw material to precipitate a salt thereof, the proceeding of the reaction is hindered. So it is best to use a small amount of the base material, a suitable amount of such base compound, in general, being a molar ratio ranging from 1/20 to 1/1000, but in case of the ion exchange resin not more than 1/2, on the basis of the nitro compound employed as the raw material. Such base compound can be added to the reaction system either directly or in the form of concentrated aqueous solution.

It is not absolutely necessary to use a solvent in the reaction according to this invention, however, a solvent inert for the reaction but capable of dissolving both the nitro compound and the alcohol can be employed, such as ethyl ether or tetrahydrofuran.

The time required for completion of the reaction varies depending upon the kind of alcohol and the reaction temperature employed; however, at the same temperature, the smaller the number of carbon atoms in the alcohol, the faster the reaction rate. In general, in the presence of a catalyst, the time required to carry out the reaction ranges from several minutes to about ten hours at a temperature close to the boiling point of the alcohol. On the other hand, a longer time is required in the absence of the catalyst; for example, at the reflux condition, 6 hours are required even in case of employing methyl alcohol with which the reaction can most readily be carried out.

After completion of the reaction, the alcohol is distilled out from the reaction mass leaving the hexanoic acid ester.

When 2,6-dinitro-cyclohexanone monoalkali metal salt is employed as the starting material, the salt is refluxed together with 30 to 100 times, preferably 50 to 100 times, its weight of alcohol. As the cleavage reaction of the cyclohexanone compound proceeds, it dissolves into the alcohol to form a uniform alcohol solution. As soon as the reactant has been completely dissolved into the alcohol, the alcohol is distilled out, an aqueous inorganic or organic acid solution is added to the remainder to neutralize it, and then the reaction mass is extracted with an inert solvent, such as ethyl ether or benzene and the solvent is distilled out to obtain 2,6-dinitrohexanoic acid ester, said ester is purified by distillation in vacuum, if necessary, and the 2,6-dinitro-hexanoic acid ester is confirmed by infrared spectrum (IR) and elementary analysis.

It is difficult to distill 6-nitro-2-oximinohexanoic acid ester produced from 6-nitro-2-oximino-1-cyclohexene-1-ol, so the ester cannot be obtained in completely pure form. However, the formation of such ester is confirmed by infrared spectrum, and elementary analysis; and by treating the product with aqueous ammonia to form an amide and then is confirmed as 6-nitro-2-oximinohexanoic acid amide dihydrate, having a melting of 95° to 96.5° C.

The preferred embodiments of this invention are given by means of following examples; however, it should be understood that these examples are only for the purpose of illustration and are not intended to limit the scope of this invention. "Part" and "percentage" given in the Example mean "by weight" unless otherwise specified.

Example 1

Figure 1:
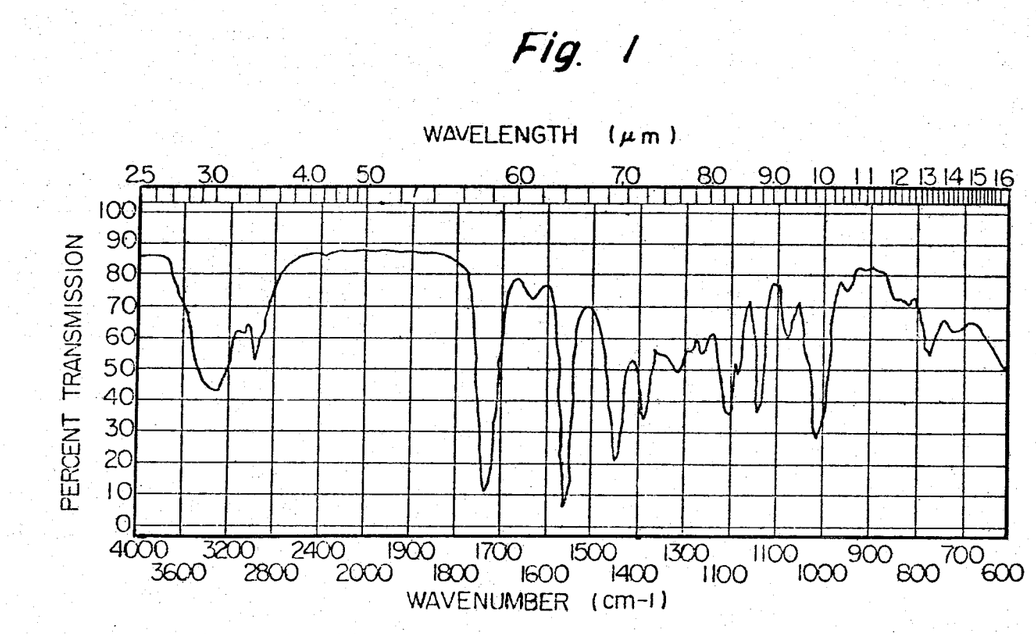

Into a solution of 17.2 parts of 2-nitro-6-oximino-1-cyclohexene-1-ol in 500 parts of methyl alcohol was added 0.172 part of metallic sodium and the reaction mass was refluxed for two hours. The mass was neutralized with 0.45 part of acetic acid and the excess methyl alcohol was removed by distillation. The remainder was diluted with 10 parts of water, extracted with ethyl ether, and dried with anhydrous sodium sulfate, and then ethyl ether was distilled out and the remaining solvent was completely distilled out under a pressure of 1 mm. Hg at 60° for 30 minutes. 18.6 parts of methyl 6-nitro-2-oximino-hexanoate was obtained as a light yellow oily product, and the yield was 91.2%. The infrared spectrum thereof is shown FIG. 1. It is analyzed as:

Calculated as $C_7H_{12}N_2O_5$: C, 41.17; H, 5.90; N, 13.72. Found: C, 41.41; H, 6.20; N, 13.69.

Figure 2:
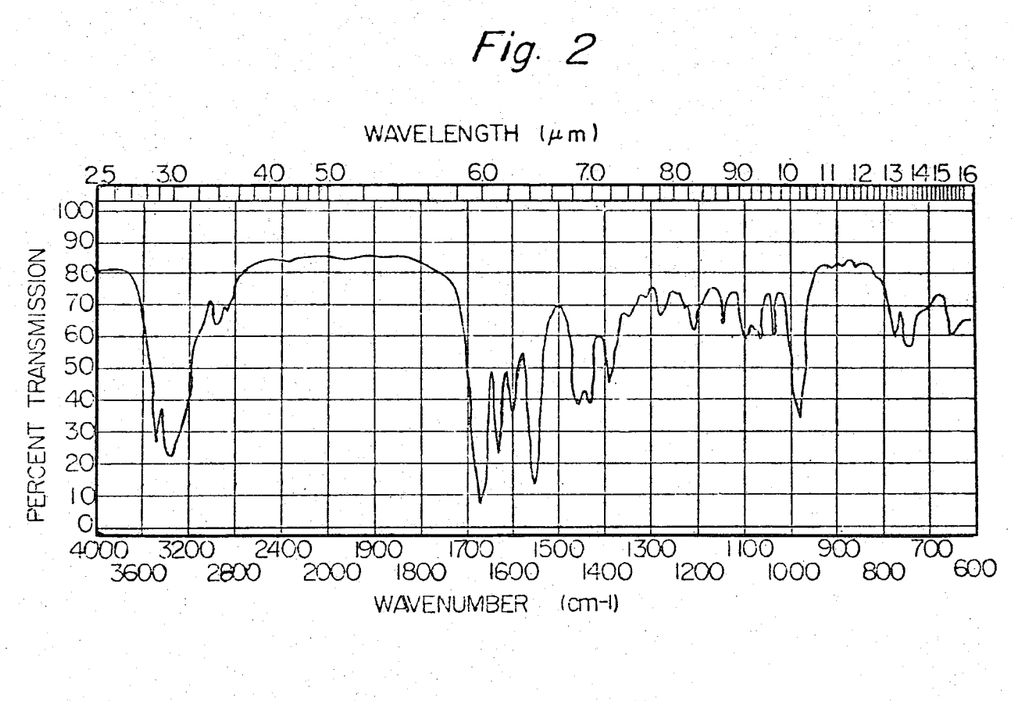

2.04 parts of the above mentioned methyl 6-nitro-2-oximino-hexanoate was admixed with 15 parts of 28% aqueous ammonia, then the mixture was allowed to stand at 60° C. for 30 minutes and further to stand at room temperature for over night. From the reaction mass ammonia was distilled out under vacuum to obtain 2.20 parts of 6-nitro-2-oximino-hexanoic acid amide in the yield of 97.7%. By recrystallization from water, a colorless crystalline powder of 6-nitro-2-oximino-hexanoic acid amide dihydrate having a melting point of 95°–96.5° C. was obtained. The infrared spectrum thereof is given in FIG. 2 and it is analyzed as:

Calculated as: $C_6H_{15}N_3O_6$: C, 32.00; H, 6.71. Found: C, 32.15; H, 6.45.

Example 2

17.2 parts of 2-nitro-6-oximino-1-cyclohexene-1-ol dissolved in 700 parts of methyl alcohol was refluxed for six hours and the methyl alcohol was distilled out from the reaction mixture under vacuum to obtain 20.2 parts of methyl 6-nitro-2-oximino-hexanoate as a light yellow product; the yield was 99%. The infrared spectrum was the same as in Example 1. From this product the same amide as in Example 1 was produced. The infrared spectrum, and melting point thereof were the same as in Example 1.

Example 3

17.2 parts of 2-nitro-6-oximino-1-cyclohexene-1-ol was dissolved into 200 parts of methyl alcohol and 0.086 part of tri-n-butyl amine was added thereto, and the reaction mass was refluxed for 15 minutes and 0.225 part of acetic acid was added to neutralize the reaction mass. Thereafter, aftertreatments similar to those in Example 1 were repeated to obtain 18.9 parts of methyl 6-nitro-2-oximino-hexanoate; the yield was 92.6% and the infrared spectrum was the same as in Example 1. From the ester so obtained an amide having an infrared spectrum and melting point the same as in Example 1 was derived in a yield of 97.2%.

Example 4

Into 17.2 parts of 2-nitro-6-oximino-1-cyclohexene-1-ol dissolved in 200 parts of methyl alcohol was added 0.086 parts of 28% aqueous ammonia and refluxed for 40 minutes. Excess methyl alcohol was entirely removed according to the procedures disclosed in Example 1 to obtain 19.4 parts of methyl 6-nitro-2-oximino-hexanoate (95.1% of yield). The IR of the ester, and the IR and melting point of the amide (97.4% of yield) derived from the ester were the same as those in Example 1.

Example 5

Figure 3:
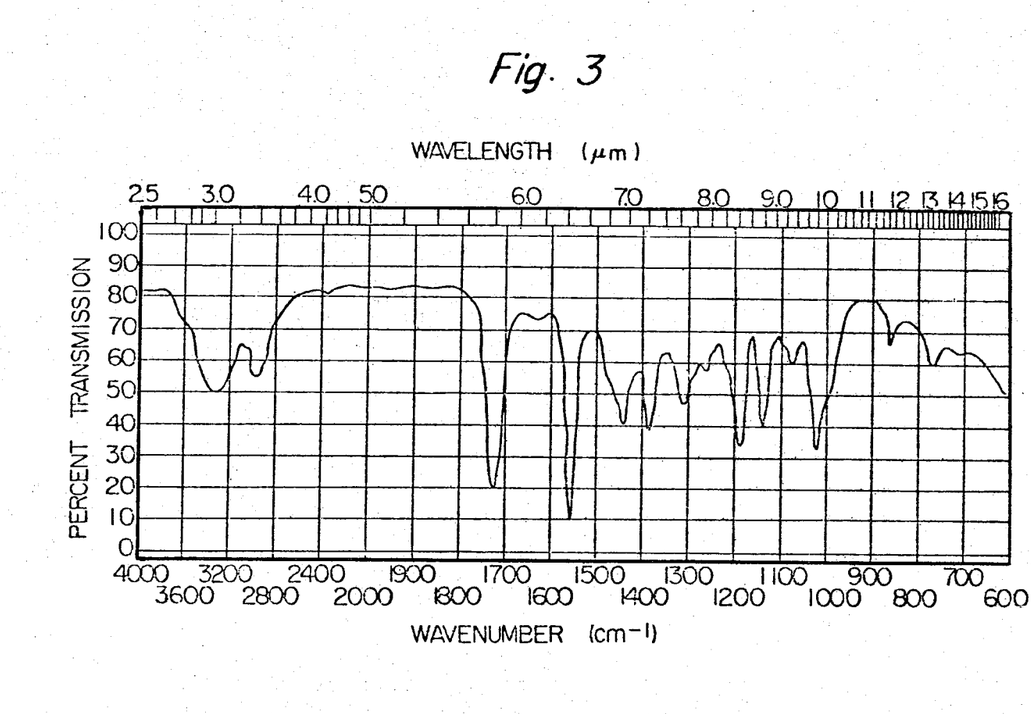

Into 17.2 parts of 2-nitro-6-oximino-1-cyclohexene-1-ol dissolved in 400 parts of ethyl alcohol was added 0.344 part of triethyl amine and the mixture was refluxed for 4 hours. Upon completely distilling out excess ethyl alcohol and triethyl amine under vacuum, 20.1 parts of ethyl 6-nitro-2-oximinchexanoate was obtained as a light yellow and oily product in the yield of 92.2%. The IR is shown in FIG. 3 and analysis is given as:

Calculated as $C_{18}H_{14}N_2O_5$: C, 44.03; H, 6.47; N, 12.84. Found: C, 44.23; H, 6.45; N, 12.52.

From the ester, amine was formed by aqueous ammonia as in Example 1 in a yield of 97.2% and the IR and melting point corresponded to those in Example 1.

Example 6

Figure 4:
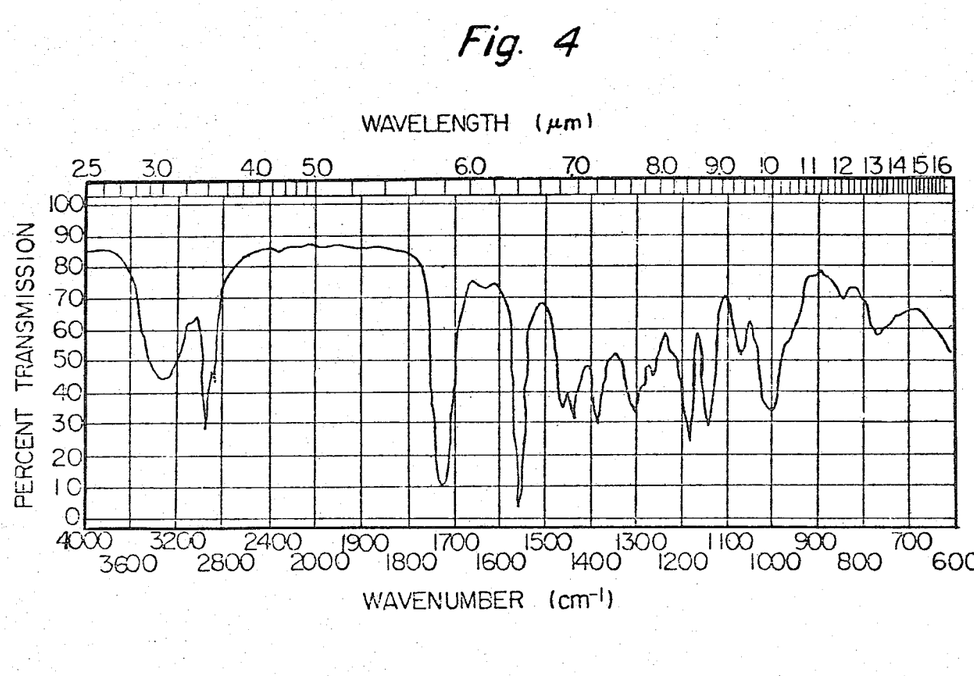

Into 17.2 parts of 2-nitro-6-oximino-1-cyclohexene-1-ol dissolved in 300 parts of n-butyl alcohol was added 0.172 parts of tri-n-butyl amine, and after refluxing for five hours 0.450 part of acetic acid was added to neutralize the reaction mixture. The aftertreatments disclosed in Example 1 were followed to obtain 21.7% (88.2% of yield) of n-butyl-6-nitro-2-oximinohexanoate. The IR of the ester is given in Fig. 4 and analysis values is:

Calculated as $C_{10}H_{18}N_2O_5$: C, 48.77; H, 7.37; N, 11.38. Found: C, 49.08; H, 7.57; N, 11.02.

The ester was converted by aqueous ammonia into amide in a yield of 98.2% having the same IR and melting point as in Example 1.

Example 7

Figure 5:
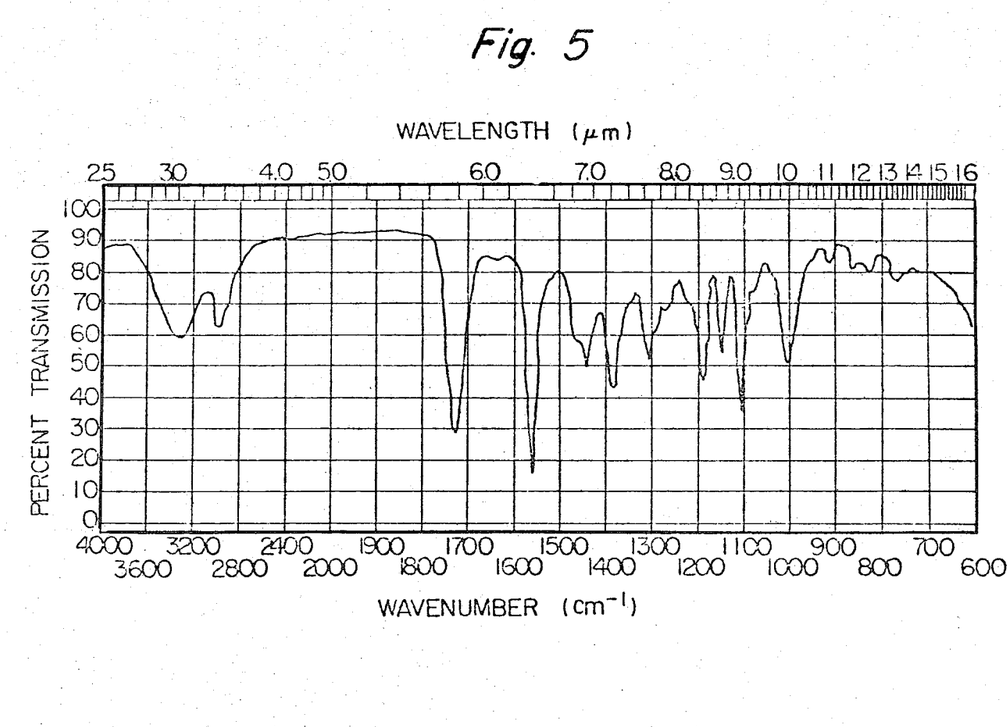

Into 17.2 parts of 2-nitro-6-oximino-1-cyclohexene-1-ol dissolved in 350 parts of isopropyl alcohol was added 0.344 part of triethyl amine, and refluxed for six and half hours. The excess alcohol was distilled out completely to obtain 22.7 parts of isopropyl 6-nitro-2-oximinohexanoate (97.8% of yield). The IR is given in FIG. 5 and the analysis is:

Calculated as $C_9H_{16}N_2O_5$: C, 46.54; H, 6.94; N, 12.06. Found: C, 46.12; H, 6.99; N, 12.29.

An amide (94.2% of yield) having IR and melting point the same as in Example 1 was derived from the ester and aqueous ammonium.

Example 8

Figure 6:
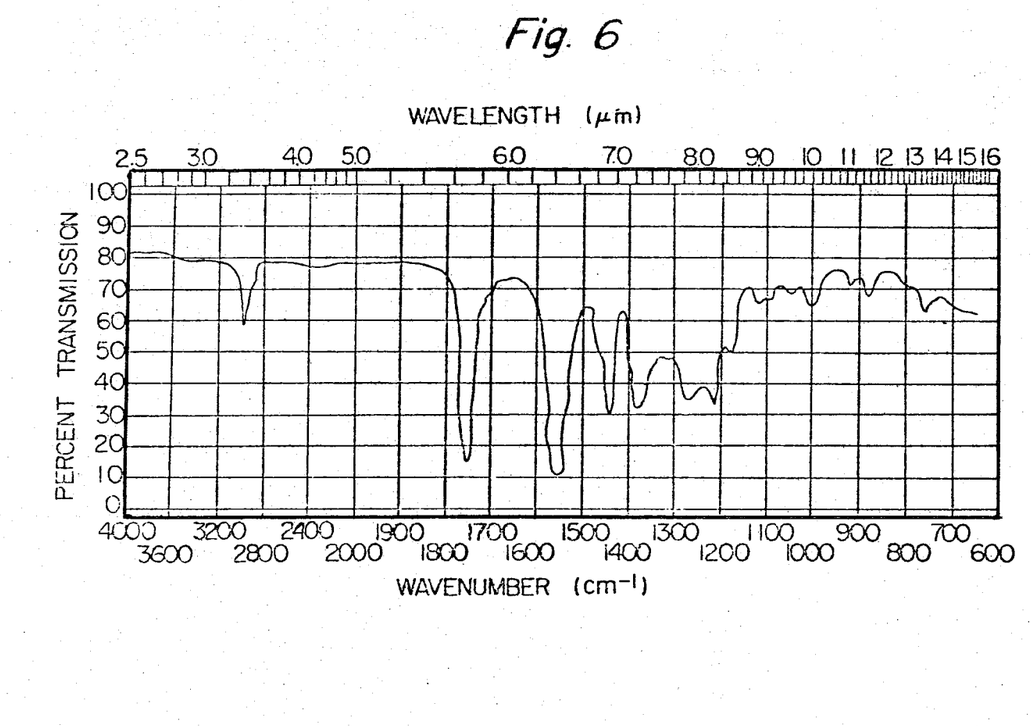

Into 18.8 parts of 2,6-dinitro-cyclohexanone dissolved in 500 parts of methyl alcohol was added 0.36 part of triethyl amine and refluxed for thirty minutes to complete the reaction. Thereafter, to remove the excess methyl alcohol, the reaction mass was distilled to obtain 20.2 parts of yellow oily material. Said oily material was purified by vacuum distillation to obtain 20.5 parts of a fraction of methyl 2,6-dinitrohexanonate (a boiling point being 151–152° C./0.4 mm. Hg) in the yield of 93.1%. It was confirmed to be methyl 2,6-dinitro-cyclohexanoate by the IR (refers to FIG. 6) and the elementary analysis as follows:

Calculated as $C_7H_{12}N_2O_6$: C, 38.18; H, 5.49; N, 12.72. Found: C, 38.50; H, 5.67; N, 12.61.

Example 9

Into 18.8 parts of 2,6-dinitro-cyclohexanone dissolved in 800 parts of ethyl alcohol was added 0.10 part of 28% aqueous ammonia and the mixture was refluxed for four hours. Then the excess ethyl alcohol was distilled out and the reminder was distilled under vacuum to obtain 22.1 parts of a fraction of ethyl-2,6-dinitrohexanonate having a boiling point of 150°–151° C./0.3 mm. Hg. The yield was 94.4%. The analysis of the product is as follows.

Calculated as $C_8H_{14}N_2O_6$: C, 41.02; H, 6.03; N, 11.96. Found: C, 41.36; H, 6.14; N, 11.98.

Figure 7:
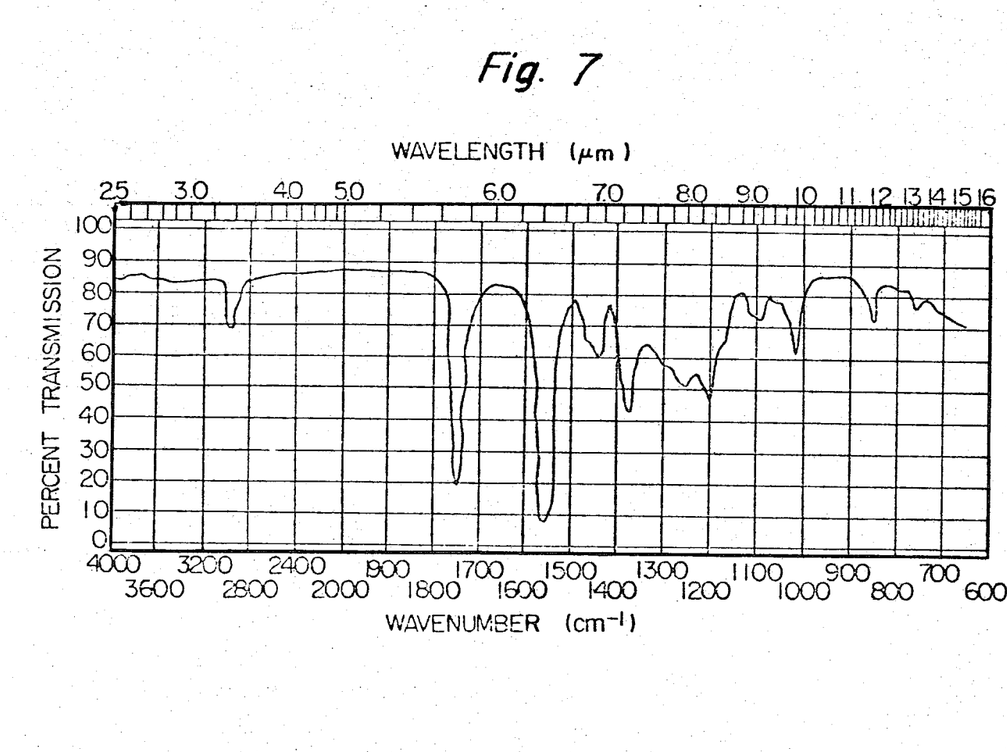

The product was also confirmed to be ethyl 2,6-dinitrohexanonate by the IR (refer to FIG 7).

Example 10

11.31 parts of monopotassium salt of 2,6-dinitro-cyclohexanone was added into 880 parts of methyl alcohol and the reaction system was refluxed with agitation for four hours by which the salt was completely dissolved. After continuing the refluxion for a further thirty minutes, the methyl alcohol was distilled out. The remainder was acidified by addition of 10% sulfuric acid and extracted three times 40 parts of ethyl ether being used each time. The extract was dried by anhydrous sodium sulfate and distilled to remove the ether. The remaining methyl 2,6-dinitro-hexanoate was purified by vacuum distillation to obtain 9.68 parts of a fraction having a boiling point of 151–152° C./0.4 mm. Hg. The yield was 88%.

Example 11

Figure 8:
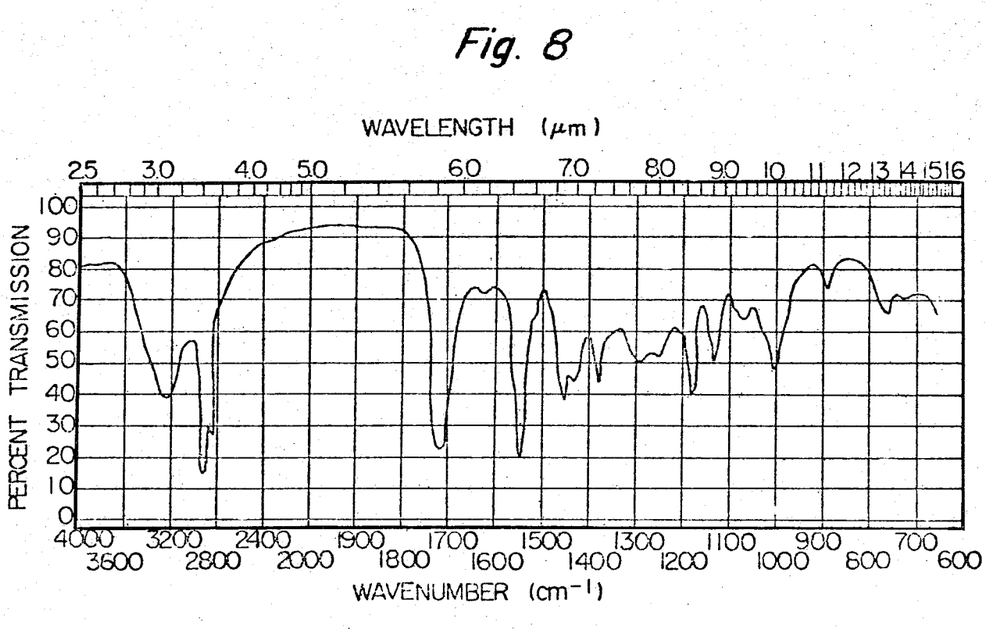

Following the procedures disclosed in Example 1, 17.2 parts of 2-nitro-6-oximino-1-cyclohexene-1-ol, 0.57 parts of pyridine and 300 parts of 2-ethyl-n-hexanol were reacted at 125° C. for three and half hours. The reaction product was a brown oily material. IR of the product is shown in FIG. 8. The product being octyl 6-nitro-2-oximino-hexanoate obtained in a yield of 67.2% was confirmed by converting the product according to the procedures disclosed in Example 1 into amide.

Examples 12–39

According to the procedures disclosed in Example 8, 2,6-dinitro-cyclohexanone in methyl alcohol was refluxed in the presence of various catalysts. The results are given in the following Table.

| Ex. | Catalyst | Amount (molar ratio) | Reaction time | Yield (percent) |
|---|---|---|---|---|
| 12 | tri-Ethyl amine | 1/100 | 30 min | 97.80 |
| 13 | do | 1/100 | 40 min | 99.0 |
| 14 | do | 1/1000 | 30 min | 56.50 |
| 15 | do | 1/1000 | 1 hr | 58.70 |
| 16 | n-Butyl amine | 1/50 | 30 min | 99.36 |
| 17 | di-n-Amyl amine | 1/50 | 30 min | 99.46 |
| 18 | Cyclohexyl amine | 1/50 | 40 min | 99.18 |
| 19 | Aniline | 1/50 | 1 hr | 90.75 |
| 20 | $NH_3$ | 1/100 | 40 min | 99.0 |
| 21 | $CH_3COONa$ | /100 | 30 min | 99.27 |
| 22 | Sodium phenolate | 1/50 | 30 min | 99.15 |
| 23 | Sodium methylate | 1/100 | 40 min | 99.0 |
| 24 | $NaO_2N=\bigcirc(=O)=NO_2Na$ | 1/100 | 30 min | 98.90 |
| 25 | Same as above | 1/100 | 40 min | 99.49 |
| 26 | $\bigcirc(OH)-CH_2-N(CH_3)_3$ (40%) | 1/100 | 30 min / 40 min | 98.69 / 99.06 |
| 27 | KOH | 1/100 | 30 min | 97.70 |
| 28 | KOH | 1/100 | 40 min | 99.33 |
| 29 | KOH | 1/1000 | 30 min | 57.00 |
| 30 | KOH | 1/1000 | 1 hr | 61.50 |
| 33 a | SA 10A | 1/25 | 50 min | 99.6 |
| 34 b | SA 21A | 2/5 | 30 min | 71.8 |
| 35 b | SA 21A | 2/5 | 1 hr | 88.8 |
| 36 b | Amberlite IR-45 | 2/5 | 30 min | 50.0 |
| 37 b | do | 2/5 | 1 hr | 63.8 |
| 38 | Non-catalyst | | 30 min | 50.0 |
| 39 | do | | 40 min | 60.0 | a The reaction temperature was 60° C.
b The reaction temperature was 28° C.

Note.—
SA 10A and SA 21A: Strongly basic anion exchange resins, available from Mitsubishi Chemical Industries Limited, Tokyo, Japan.
Amberlite IR-45: Weakly basic anion exchange resin, available from Rohm and Haas Co., U.S.A.

What is claimed is:

1. A process for manufacturing a 6-nitro-2-substituted hexanoic acid ester which comprises reacting an alicyclic compound of the group consisting of 2-nitro-6-oximino-1-cyclohexene-1-ol, 2,6-dinitrocyclohexanone, and a mon-oalkali metal salt of said 2,6-dinitrocyclohexanone with a lower alkanol and a substance which consists essentially of an effective amount of a basic catalyst until an ester of said alkanol with a 6-nitro-2-substituted hexanoic acid is obtained, the 2-substituent of said acid being oximino if said alicyclic compound is 2-nitro-6-oximino-1-cyclohexene-1-ol, and the 2-substituent of said acid being nitro if said alicyclic compound is 2,6-dinitrocyclohexanone or said mono-alkali metal salt thereof.

2. A process according to claim 1 in which said basic catalyst is at least one member selected from the group consisting of ammonium hydroxide, a primary, secondary and tertiary amine, benzyl trimethyl ammonium hydroxide, a strongly or weakly basic anion ion exchange resin, an alkali and alkaline earth metal, salts thereof with an inorganic and organic acid having a dissociation constant smaller than $1.3 \times 10^{-3}$, and a phenolate and alcoholate of an alkali and alkaline earth metal.

3. A process according to claim 1 in which said basic catalyst is used in a molar ratio of 0.001 to 0.5 to the alicyclic nitro compound.

4. A process according to claim 1 in which the alicyclic nitro compound is 2,6-dinitro cyclohexanone or a mono alkali metal salt thereof and the alcohol is methanol or ethanol.

5. A process according to claim 1 in which the alicyclic nitro compound is 2-nitro-6-oximino-1-cyclohexene-1-ol or a monoalkali metal salt thereof and the alcohol is selected from the group consisting of methanol and ethanol.

6. A process according to claim 1 in which the reaction is carried out at a temperature from 20 to 130° C.

References Cited
UNITED STATES PATENTS

| | | | |
|---|---|---|---|
| 3,518,302 | 6/1970 | Ellis | 260—526 |
| 3,534,074 | 10/1970 | Feuer | 260—478 |
| 3,059,018 | 10/1962 | Johnson et al. | 260—465.4 |
| 3,551,465 | 12/1970 | Ellis | 260—410.9 |
| 3,637,839 | 1/1972 | Tanaka et al. | 260—534 |

OTHER REFERENCES

Matlack et al., Chem. Abstracts, vol. 67 (1967), p. 2003, abs. no 21308C.

Wagner et al., Synthetic Org. Chem., Wiley, New York (1953), p. 599.

JAMES A. PATTEN, Primary Examiner

U.S. Cl. X.R.

260—482, R 534 L